(12) United States Patent
Shimomori

(10) Patent No.: US 12,269,613 B2
(45) Date of Patent: Apr. 8, 2025

(54) SYSTEM FOR PERFORMING AUTOMATIC INSPECTION OF PASSENGER BOARDING BRIDGE

(71) Applicant: SHINMAYWA INDUSTRIES, LTD., Takarazuka (JP)

(72) Inventor: Wataru Shimomori, Takarazuka (JP)

(73) Assignee: SHINMAYWA INDUSTRIES, LTD., Takarazuka (JP)

(*) Notice: Subject to any disclaimer, the term of this patent is extended or adjusted under 35 U.S.C. 154(b) by 728 days.

(21) Appl. No.: 17/634,203

(22) PCT Filed: Sep. 24, 2019

(86) PCT No.: PCT/JP2019/037287
§ 371 (c)(1),
(2) Date: Feb. 9, 2022

(87) PCT Pub. No.: WO2021/059330
PCT Pub. Date: Apr. 1, 2021

(65) Prior Publication Data
US 2022/0315245 A1    Oct. 6, 2022

(51) Int. Cl.
*B64F 1/305*    (2006.01)
*B64F 1/36*     (2017.01)
*G08B 21/22*    (2006.01)

(52) U.S. Cl.
CPC .............. *B64F 1/305* (2013.01); *B64F 1/36* (2013.01); *G08B 21/22* (2013.01)

(58) Field of Classification Search
CPC ............ B64F 1/305; B64F 1/36; G08B 21/22; G06Q 10/063; G06Q 10/20; G06Q 50/40
See application file for complete search history.

(56) References Cited

U.S. PATENT DOCUMENTS

2018/0354650 A1    12/2018    Tan et al.

FOREIGN PATENT DOCUMENTS

| JP | H05288345 A | 11/1993 | |
|----|----|----|----|
| JP | 2004161195 A | 6/2004 | |
| JP | 2005003917 A | 1/2005 | |
| JP | 4066419 B2 | 3/2008 | |
| JP | 2013242642 A | 12/2013 | |
| WO | WO-2005025987 A1 * | 3/2005 | .............. B64F 1/305 |

* cited by examiner

*Primary Examiner* — Gary S Hartmann
(74) *Attorney, Agent, or Firm* — Alleman Hall & Tuttle LLP

(57) ABSTRACT

A system for performing an automatic inspection of a passenger boarding bridge. The passenger boarding bridge is connected to a terminal building, and includes a plurality of devices that are operatable. The system includes: a notifier provided on the passenger boarding bridge; and a controller configured to control each of the devices and the notifier. The controller is configured to: when an inspection start command is inputted to the controller, perform an operation test of each of the devices in a predetermined order to detect abnormality in each device; and during a period from when the inspection start command is inputted to the controller until the operation test of a last device among the devices is ended, cause the notifier to notify operation test-related information inside and/or outside the passenger boarding bridge.

4 Claims, 6 Drawing Sheets

SYSTEM FOR PERFORMING AUTOMATIC INSPECTION OF PASSENGER BOARDING BRIDGE

TECHNICAL FIELD

The present invention relates to a system for performing an automatic inspection of a passenger boarding bridge.

BACKGROUND ART

At an airport, a passenger boarding bridge that connects between a terminal building and an aircraft is often used for boarding onto and disembarking from the aircraft.

Patent Literature 1 discloses performing test operation of a passenger boarding bridge before docking the passenger boarding bridge with an aircraft. During the test operation, a terminal device installed in the cab of the passenger boarding bridge detects the presence or absence of abnormality in the devices of the passenger boarding bridge, and transmits data relating to abnormality to a centralized management server of a maintenance section that is in charge of the maintenance of the passenger boarding bridge.

CITATION LIST

Patent Literature

PTL 1: Japanese Patent No. 4066419

SUMMARY OF INVENTION

Technical Problem

The above-described configuration of Patent Literature 1 does not give consideration to the aspect of coordination with persons, such as workers, when performing the test operation for an inspection of the passenger boarding bridge.

The present invention has been made to solve the above-described problems. An object of the present invention is to provide a system for performing an automatic inspection of a passenger boarding bridge, the system making it possible to efficiently perform the automatic inspection of the passenger boarding bridge in improved coordination with persons, such as workers.

Solution to Problem

In order to achieve the above-described object, a system for performing an automatic inspection of a passenger boarding bridge according to one aspect of the present invention is a system for performing an automatic inspection of a passenger boarding bridge, the passenger boarding bridge being connected to a terminal building and including a plurality of devices that are operatable, the system including: a notifier provided on the passenger boarding bridge; and a controller configured to control each of the devices and the notifier. The controller is configured to: when an inspection start command is inputted to the controller, perform an operation test of each of the devices in a predetermined order to detect presence or absence of abnormality in each device; and during a period from when the inspection start command is inputted to the controller until the operation test of a last device among the devices is ended, cause the notifier to notify operation test-related information inside and/or outside the passenger boarding bridge.

According to the above configuration, during the period from when the inspection start command is inputted to the controller until the operation test of the last device is ended (i.e., during an automatic inspection period), the operation test-related information is notified inside and/or outside the passenger boarding bridge, and thereby a warning can be given inside and/or outside the passenger boarding bridge. This makes it possible to efficiently perform the automatic inspection of the passenger boarding bridge in improved coordination with persons, such as workers. The input of the inspection start command to the controller can be performed via communications, for example, by performing an inspection start operation with an external device that is located at a remote position from the passenger boarding bridge. By merely performing the inspection start operation, the automatic inspection can be carried out.

In the present specification and the claims, the operation test-related information includes at least one of the following types of information: information that is notified before the start of the operation test of the first device among the devices, the information indicating that the automatic inspection is going to start; information that is notified during the automatic inspection period, the information indicating that the automatic inspection is being performed; information that is notified before the operation test of each device is performed (started), the information indicating that the operation test of the device is going to start; information that is notified while the operation test of each device is being performed, the information indicating that the operation test of the device is being performed; and information that urges a person to retreat. The operation test-related information may be notified in any manner, so long as the notified information is recognizable by a person, such as a worker. The operation test-related information may be notified, for example, in the form of verbal information outputted from a speaker, or in the form of audio information outputted from a speaker, such as particular music or a sound of a siren or the like, or in the form of light information from, for example, a revolving lamp, or any other lighting equipment, that emits light in a particular color, or in the form of characters and/or symbols displayed by a display device.

The system may further include: a first sensor that detects a person inside the passenger boarding bridge; and a second sensor that detects a person outside the passenger boarding bridge. The controller may be configured to: in a case where a person is detected by the first sensor and/or the second sensor before performing the operation test of each device, cause the notifier to notify the operation test-related information that urges the person to retreat; and then perform the operation test when each of the first sensor and the second sensor detects no person any more.

According to the above configuration, which includes the first sensor and the second sensor, the operation test is performed when no person is detected any more both inside and outside the passenger boarding bridge. This makes it possible to perform the operation test in improved coordination with persons.

The system may further include: a first sensor that detects a person inside the passenger boarding bridge; and a second sensor that detects a person outside the passenger boarding bridge. The controller may be configured to: in a case where a person is detected by the first sensor and/or the second sensor while the operation test of each device is being performed, temporarily stop the operation test and cause the notifier to notify the operation test-related information that urges the person to retreat; and then resume the operation test when each of the first sensor and the second sensor detects no person any more.

According to the above configuration, which includes the first sensor and the second sensor, in a case where a person is detected while the operation test is being performed, the operation test is stopped temporarily, and thereafter, when no person is detected any more, the operation test is resumed. This makes it possible to perform the operation test in improved coordination with persons.

In the operation test of each device, the controller may be configured to perform control of the device to: cause the device to operate in one direction; and then cause the device to operate in a reverse direction, such that at an end of the operation test, the device is brought back to a state that the device is in at a start of the operation test.

According to the above configuration, when all the operation tests are ended (i.e., when the inspection is ended), the passenger boarding bridge is in a state that the passenger boarding bridge is in before the start of the first operation test (i.e., a state that the passenger boarding bridge is in before the start of the inspection). Accordingly, when the inspection is ended, the passenger boarding bridge is in a predetermined state at a predetermined position where the passenger boarding bridge stands by before being operated (i.e., before being docked with an aircraft). This makes it possible to smoothly perform the operation of docking the passenger boarding bridge with the aircraft when the aircraft arrives.

Advantageous Effects of Invention

The present invention is configured as described above, and has an advantage of being able to provide a system for performing an automatic inspection of a passenger boarding bridge, the system making it possible to efficiently perform the automatic inspection of the passenger boarding bridge in improved coordination with persons, such as workers.

The above object, other objects, features, and advantages of the present invention will be made clear by the following detailed description of a preferred embodiment with reference to the accompanying drawings.

DESCRIPTION OF EMBODIMENTS

Figure 1:
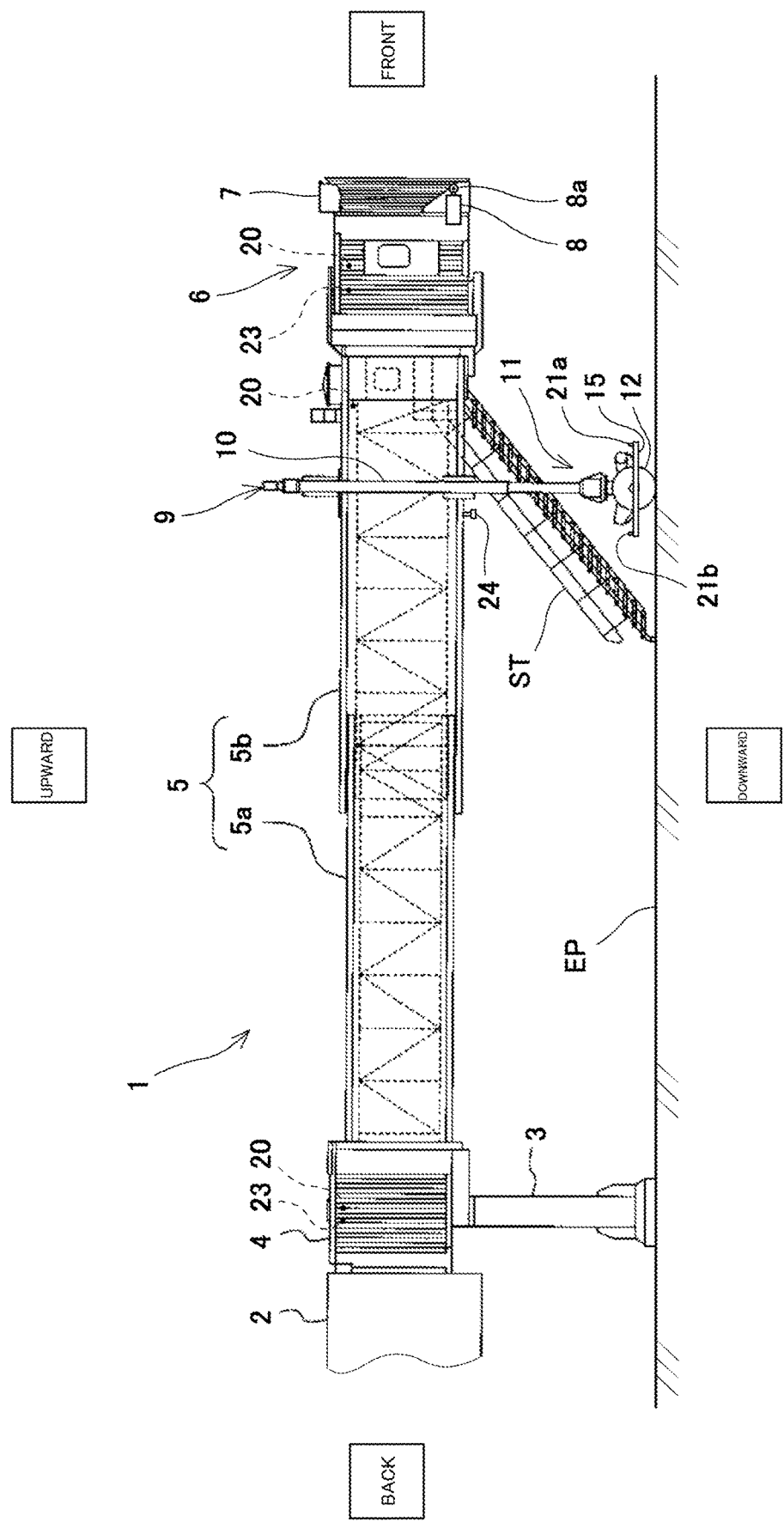
FIG. 1 is a schematic side view showing one example of a passenger boarding bridge according to one embodiment of the present invention.

Hereinafter, a preferred embodiment of the present invention is described with reference to the drawings. In the drawings, the same or corresponding elements are denoted by the same reference signs, and repeating the same descriptions is avoided below. The present invention is not limited to the embodiment described below.

Embodiment

FIG. 1 is a schematic side view showing one example of a passenger boarding bridge according to the present embodiment. FIG. 1 shows the passenger boarding bridge in a state where the overall length of a tunnel unit 5 thereof is extended.

Hereinafter, for the sake of convenience of the description, the direction in which the overall length of the tunnel unit 5 of the passenger boarding bridge 1 is extended and retracted is referred to as a front-back direction; the direction in which the gravitational force is exerted on the passenger boarding bridge 1 is referred to as a vertical direction; and the width direction of the passenger boarding bridge 1 (i.e., the direction orthogonal to the front-back direction and the vertical direction) is referred to as a left-right direction. In addition, as shown in FIG. 1, the aircraft side of the passenger boarding bridge 1 is referred to as a "front" side, and the terminal building 2 side of the passenger boarding bridge 1 is referred to as a "back" side in the description below.

The passenger boarding bridge 1 of the present embodiment includes: a rotunda (a rear round room) 4 connected to an entrance of the terminal building 2 and supported such that the rotunda 4 is rotatable about a vertical axis; the tunnel unit 5 whose proximal end is connected to the rotunda 4, the tunnel unit 5 being swingable vertically such that the distal end of the tunnel unit 5 is liftable and lowerable; a cab (a front round room) 6 rotatably provided at the distal end of the tunnel unit 5; drive columns 9 configured to support the tunnel unit 5 at the distal side of the tunnel unit 5; and auxiliary stairs ST.

The rotunda 4 is supported by a support pillar 3, such that the rotunda 4 is rotatable in regular and reverse directions about a rotational axis (vertical axis).

The tunnel unit 5 forms a passenger walkway, and includes a plurality of tubular tunnels 5a and 5b, which are fitted together in a telescopic manner (nested manner), such that the tunnel unit 5 is extendable and retractable in the longitudinal direction. In the description herein, the tunnel unit 5 is formed by the two tunnels 5a and 5b as one example. The tunnel unit 5 is formed by two or more tunnels. The proximal end part of the tunnel unit 5 is connected to the rotunda 4 in such a manner that the tunnel unit 5 is liftable and lowerable (swingable vertically).

The distal side of the tunnel unit 5 (specifically, the tunnel 5b, which is the frontmost tunnel) is provided with the drive columns 9, which serve as support legs. The drive columns 9 include a lifting/lowering device 10, which moves the cab 6 and the tunnel unit 5 upward and downward (i.e., lifts and lowers the cab 6 and the tunnel unit 5). By moving the tunnel unit 5 upward/downward by the lifting/lowering device 10, the cab 6 and the tunnel unit 5 can be swung vertically with respect to the rotunda 4.

The drive columns 9 further include a travel device 11 including a pair of travel wheels 12, which are drivable to rotate independently of each other. The travel device 11 is mounted below the lifting/lowering device 10. The travel device 11 is configured to travel forward and backward by the rotation of the two travel wheels 12, and the travel direction of the travel device 11 is changeable. As a result of the travel device 11 (travel wheels 12) traveling on the ground of an apron EP, the tunnel unit 5 can be rotated about the rotunda 4, and the tunnel unit 5 can be extended/retracted. It should be noted that the drive columns 9 may be provided not on the tunnel 5*b*, but on the cab 6.

The cab 6 is provided at the distal end of the tunnel unit 5. The cab 6 is configured to be rotatable, by means of an unshown rotational mechanism (a cab rotator 62 shown in FIG. 4), in regular and reverse directions about a rotational axis that is perpendicular to the floor surface of the cab 6. A control board (not shown) is installed in the cab 6, and an operator can operate the passenger boarding bridge 1 by using, for example, a joystick of the control board.

The cab 6 includes a walkway and a closure 7. The walkway of the cab 6 is a passage that connects to the walkway of the tunnel unit 5. The walkway of the cab 6 includes: a fixed floor (not shown) that rotates in accordance with rotation of the cab 6; and a floor connected to the fixed floor and configured to be inclinable in a width direction relative to the fixed floor (hereinafter, "inclinable floor"). It should be noted that since the inclination mechanism of the inclinable floor is known, the inclination mechanism (i.e., inclinable floor equipment 61 shown in FIG. 4) is not described in detail herein, but is described below briefly.

For example, the fixed floor and the inclinable floor are coupled to each other via a coupling hinge or the like that is not shown. The inclinable floor equipment 61 (see FIG. 4) is configured to move the right end portion or the left end portion of the inclinable floor vertically with the motive force of a motor. When the right end portion or the left end portion of the inclinable floor moves vertically, the front end portion of the inclinable floor swings about the coupling hinge. Consequently, the inclinable floor is inclined in the width direction, and the front end portion of the inclinable floor can be made parallel to the surface of the apron EP. A part of the front end portion of the inclinable floor, the part facing the aircraft, is provided with a bumper.

The closure 7 includes a bellows portion that is expandable and contractible in the front-back direction. At the time of docking the cab 6 with the aircraft, by expanding the bellows portion forward, the front end of the bellows portion can be brought into contact with the aircraft around the entrance thereof.

A level detector 8 is disposed on a side wall of the cab 6. The level detector 8 is a device that detects the amount of upward/downward movement of the aircraft relative to the cab 6 when the aircraft moves upward/downward due to, for example, boarding/disembarking of passengers or loading/unloading of cargo after the cab 6 is docked with the entrance of the aircraft. Here, the amount of upward/downward movement of the aircraft relative to the cab 6 is detected for the purpose of changing the height of the cab 6 to follow the upward/downward movement of the aircraft. The height of the cab 6 is changed by driving the lifting/lowering device 10.

The level detector 8 includes a wheel 8*a*, which is movable forward and backward. The level detector 8 moves the wheel 8*a* forward to bring the wheel 8*a* into a state where the wheel 8*a* is pressed against the surface of the fuselage of the aircraft with an optimal pressure. The wheel 8*a* rotates when the aircraft moves upward or downward. The level detector 8 is configured to detect, based on the rotation direction and the rotation angle of the wheel 8*a*, the amount of upward/downward movement of the aircraft relative to the cab 6 (hereinafter, the amount of upward/downward movement of the aircraft relative to the cab 6 is also simply referred to as an "upward/downward moving amount of the aircraft"). When the upward/downward moving amount of the aircraft detected by the level detector 8 is greater than or equal to a predetermined amount, the level detector 8 outputs the detected upward/downward moving amount of the aircraft to a controller 50. The controller 50 controls the lifting/lowering device 10 of the drive columns 9, such that the cab 6 moves in a manner to follow the upward/downward movement of the aircraft.

The auxiliary stairs ST are provided on the side of the tunnel unit 5 in a manner to connect between the inside of the tunnel unit 5 and the ground of the apron EP. The auxiliary stairs ST are used, for example, to allow the operator to get in and out of the cab 6.

A plurality of motion sensors 20 and announcement speakers (internal speakers) 23 are installed inside the passenger boarding bridge 1. The plurality of motion sensors 20 are first sensors. The announcement speakers 23 are announcement equipment, and serve as one example of a notifier. Laser scanners 21 (21*a*, 21*b*) and an announcement speaker (external speaker) 24 are installed outside the passenger boarding bridge 1. The laser scanners 21 are second sensors. The announcement speaker (external speaker) 24 is announcement equipment, and serves as one example of the notifier. The installation locations and so forth of these components are further described below with reference to FIG. 2 and FIG. 3.

Figure 2:
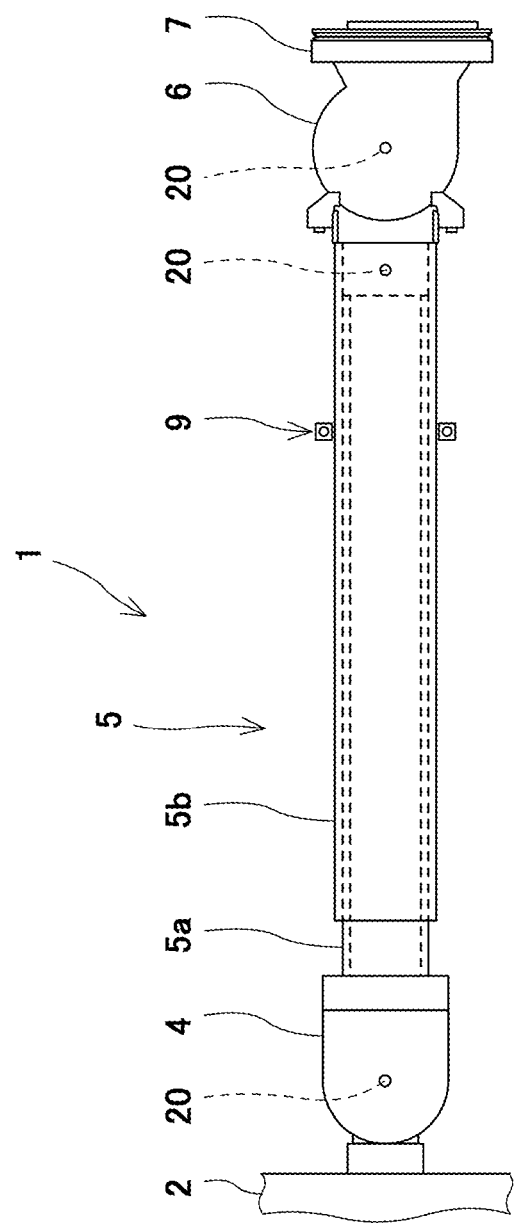
FIG. 2 is a schematic plan view of the passenger boarding bridge of FIG. 1 as seen from above.

FIG. 2 is a schematic plan view of the passenger boarding bridge 1 of FIG. 1 as seen from above. FIG. 2 shows a state where the overall length of the tunnel unit 5 is retracted.

Each of the motion sensors 20 is intended for detecting a person present inside the passenger boarding bridge 1. As shown in FIG. 1 and FIG. 2, for example, the motion sensors 20 are installed on the ceilings of the rotunda 4, the tunnel 5*b*, and the cab 6. The motion sensors 20 are not particularly limited, so long as every person present in all the interior areas of the passenger boarding bridge 1 can be detected with any of the motion sensors 20. The installation locations of the motion sensors 20 and the number of motion sensors 20 to be installed may be changed as necessary.

As shown in FIG. 1, the internal speakers 23 are installed, for example, on the ceilings of the rotunda 4 and the cab 6. The internal speakers 23 are not particularly limited, so long as every person present in all the interior areas of the passenger boarding bridge 1 can hear an announcement from any of the internal speakers 23. The installation locations of the internal speakers 23 and the number of internal speakers 23 to be installed may be changed as necessary.

Figure 3:
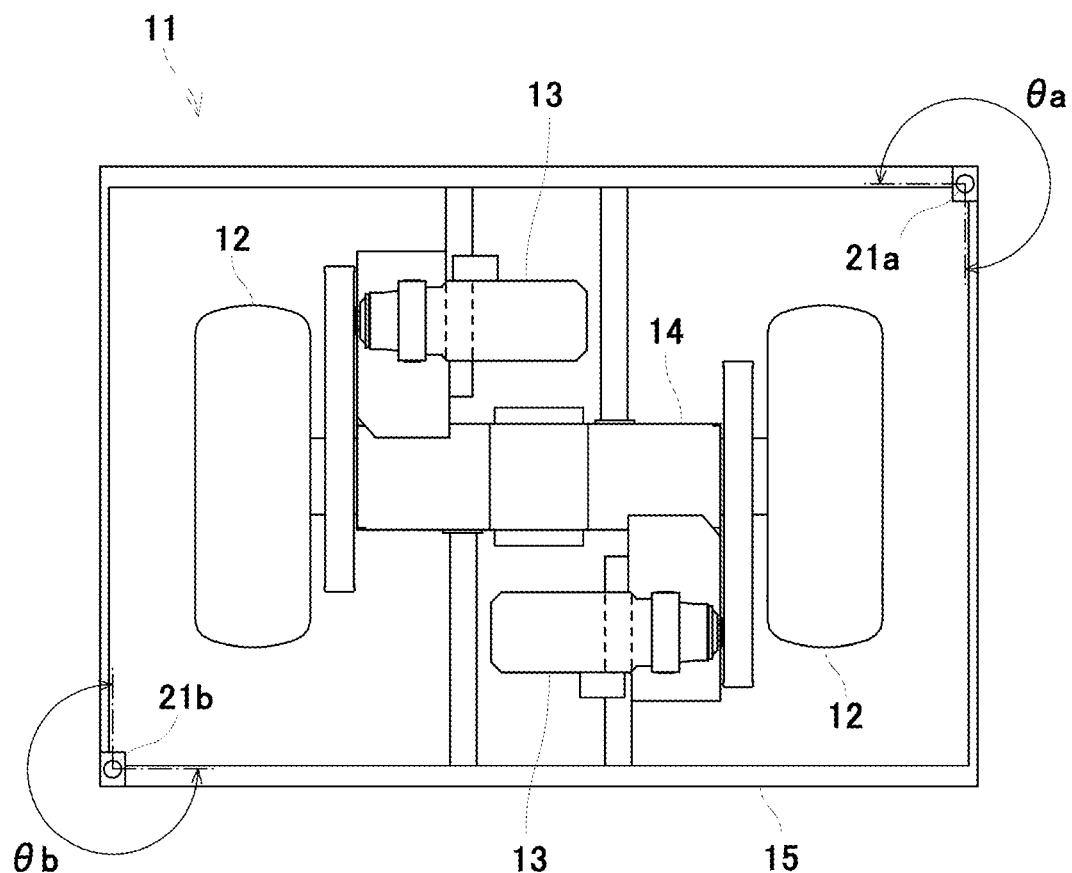
FIG. 3 is a schematic plan view of a travel device, and its vicinity, of the passenger boarding bridge of FIG. 1.

FIG. 3 is a schematic plan view showing the travel device 11 and the laser scanners 21*a* and 21*b* mounted in the vicinity thereof. Each of the laser scanners 21*a* and 21*b* is intended for detecting a person.

The travel wheels 12 of the travel device 11 are driven by respective motors 13. A rectangular frame-shaped support member 15 is horizontally mounted to an axle cover 14 of the travel wheels 12 via suitable components. The laser scanners 21*a* and 21*b* are installed on the support member 15 in the vicinity of respective corners thereof that face each other. The laser scanner 21*a* has a detection angle range θa of 270 degrees, and the laser scanner 21*b* has a detection angle range θb of 270 degrees. Around the entire surroundings of the travel device 11 in the horizontal direction, the presence of a person can be detected with the two laser scanners 21*a* and 21*b*. A detection area is preset for each of the laser scanners 21*a* and 21*b* so that a person present within a certain distance from the travel device 11 can be detected.

As shown in FIG. 1, the external speaker 24 is installed, for example, on the drive columns 9 or on the bottom surface of the tunnel 5b near the drive columns 9. The external speaker 24 is not particularly limited, so long as every person present in a predetermined area in the vicinity of the travel device 11 (e.g., an area that includes the detection areas of the laser scanners 21a and 21b) can hear an announcement from the external speaker 24. The installation location of the external speaker 24 and the number of external speakers 24 to be installed may be changed as necessary.

Figure 4:
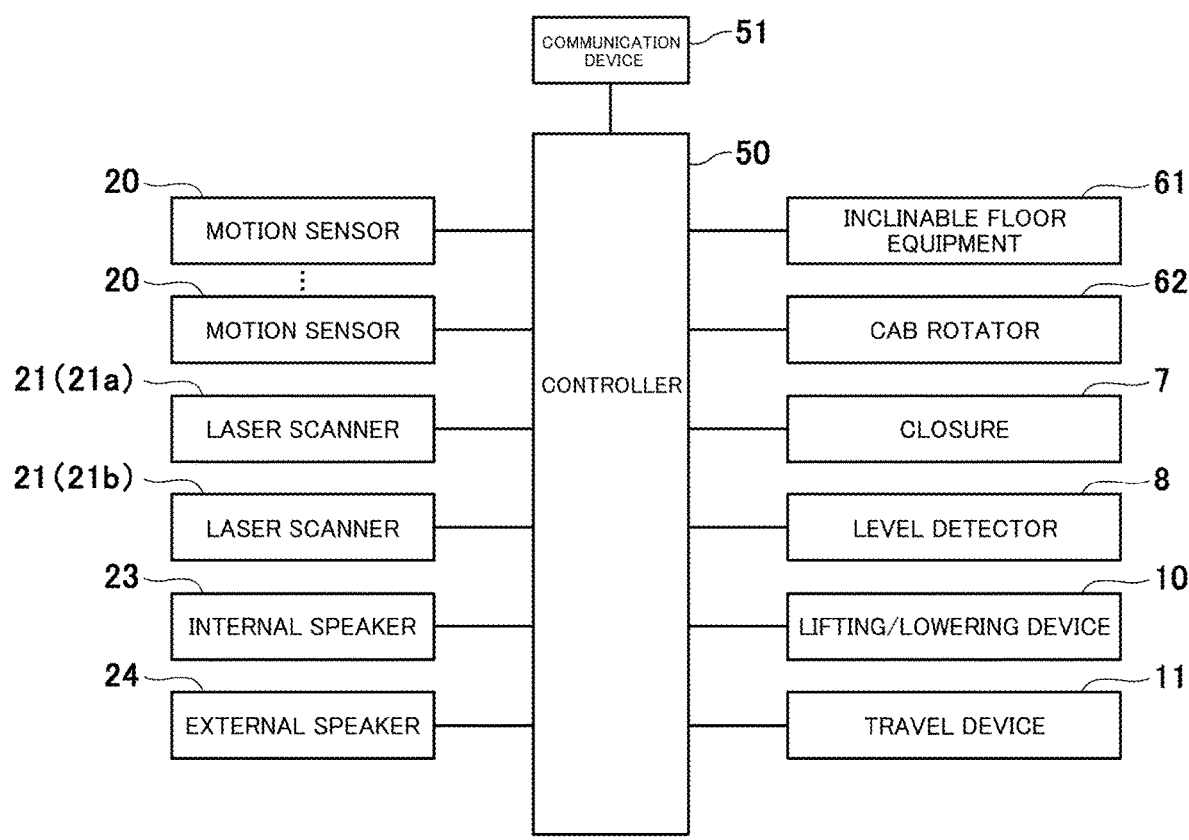
FIG. 4 is a block diagram schematically showing a connection relationship between a controller of the passenger boarding bridge of FIG. 1 and each component of the passenger boarding bridge.

FIG. 4 is a block diagram schematically showing a connection relationship between the controller and each component of the passenger boarding bridge 1 of FIG. 1.

The controller 50 and a communication device 51 of the passenger boarding bridge 1 are, for example, disposed in the cab 6 or the frontmost tunnel 5b. The controller 50 may be configured in any manner, so long as the controller 50 has control functions. The controller 50 includes, for example, an arithmetic operation unit such as a CPU and a storage unit including a ROM, RAM, etc. Control programs for operating the components of the passenger boarding bridge 1 (including an automatic inspection program that will be described below) and information necessary for the operations of the components of the passenger boarding bridge 1 are prestored in the storage unit. By executing the control programs, the arithmetic operation unit (CPU) can control the operations of the components of the passenger boarding bridge 1. Information to be stored while the passenger boarding bridge 1 is in operation is also stored in the storage unit. The controller 50 may be configured as a single control device performing centralized control, or may be configured as a plurality of control devices performing distributed control in cooperation with each other. The communication device 51 is a device that communicates with an external device (one example of the external device is a management server of, for example, a maintenance section that is in charge of the maintenance of the passenger boarding bridge; the management server may be a cloud computing server). The communication device 51 may communicate with the external device by wireless and/or wired communication. The communication device 51 may be included in the controller 50.

Examples of devices controlled by the controller 50 include the inclinable floor equipment 61 of the cab 6, the cab rotator 62, the closure 7, the level detector 8, the lifting/lowering device 10, and the travel device 11. It should be noted that, for example, the controller 50 may be divided into individual controllers and an integrated controller. Each of the individual controllers is provided for a corresponding one of the devices, and controls the corresponding device. The integrated controller performs integrated control of, for example, these individual controllers.

The controller 50 is configured to receive detection signal inputs from the motion sensors 20 and the laser scanners 21, and to cause each of the internal and external speakers 23 and 24 to make a predetermined announcement (i.e., to perform audio output) as necessary. The contents of the announcement are prestored in the storage unit as an audio file. Although FIG. 1 shows two internal speakers 23, FIG. 4 shows only one internal speaker 23 as a representative example.

A system for performing an automatic inspection of a passenger boarding bridge according to the present embodiment is configured to perform an automatic inspection of the passenger boarding bridge 1 before operating the passenger boarding bridge 1. In the description herein, "before operating the passenger boarding bridge 1" means "before docking the passenger boarding bridge 1 with an aircraft", and at the latest, "before the aircraft arrives at the apron EP where the passenger boarding bridge 1 is used". Before operating the passenger boarding bridge 1, the passenger boarding bridge 1 stands by in a predetermined state at a predetermined standby position.

Figure 5:
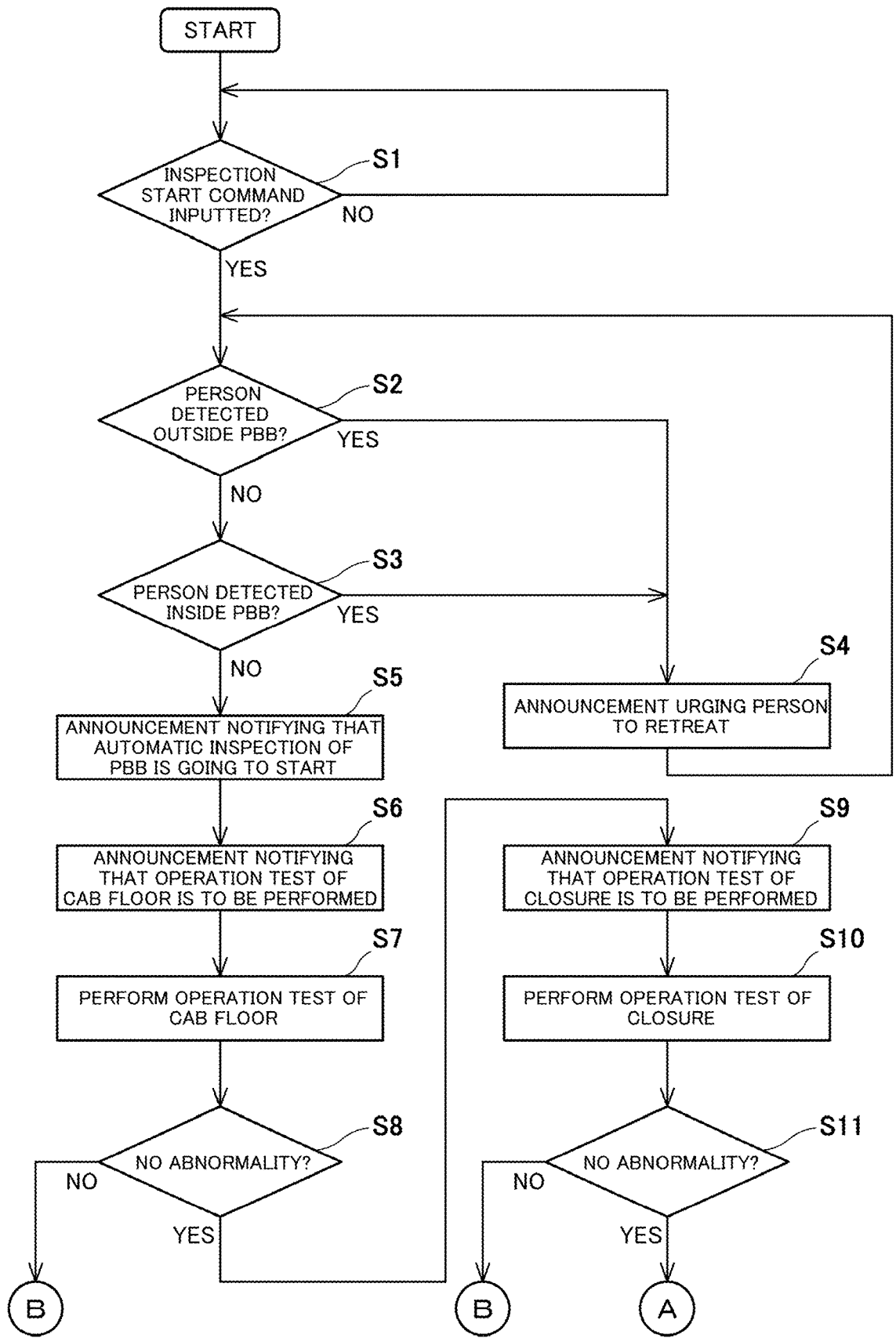
FIG. 5 is a flowchart showing one example of operations performed when an automatic inspection is performed before operating the passenger boarding bridge of FIG. 1.
Figure 6:
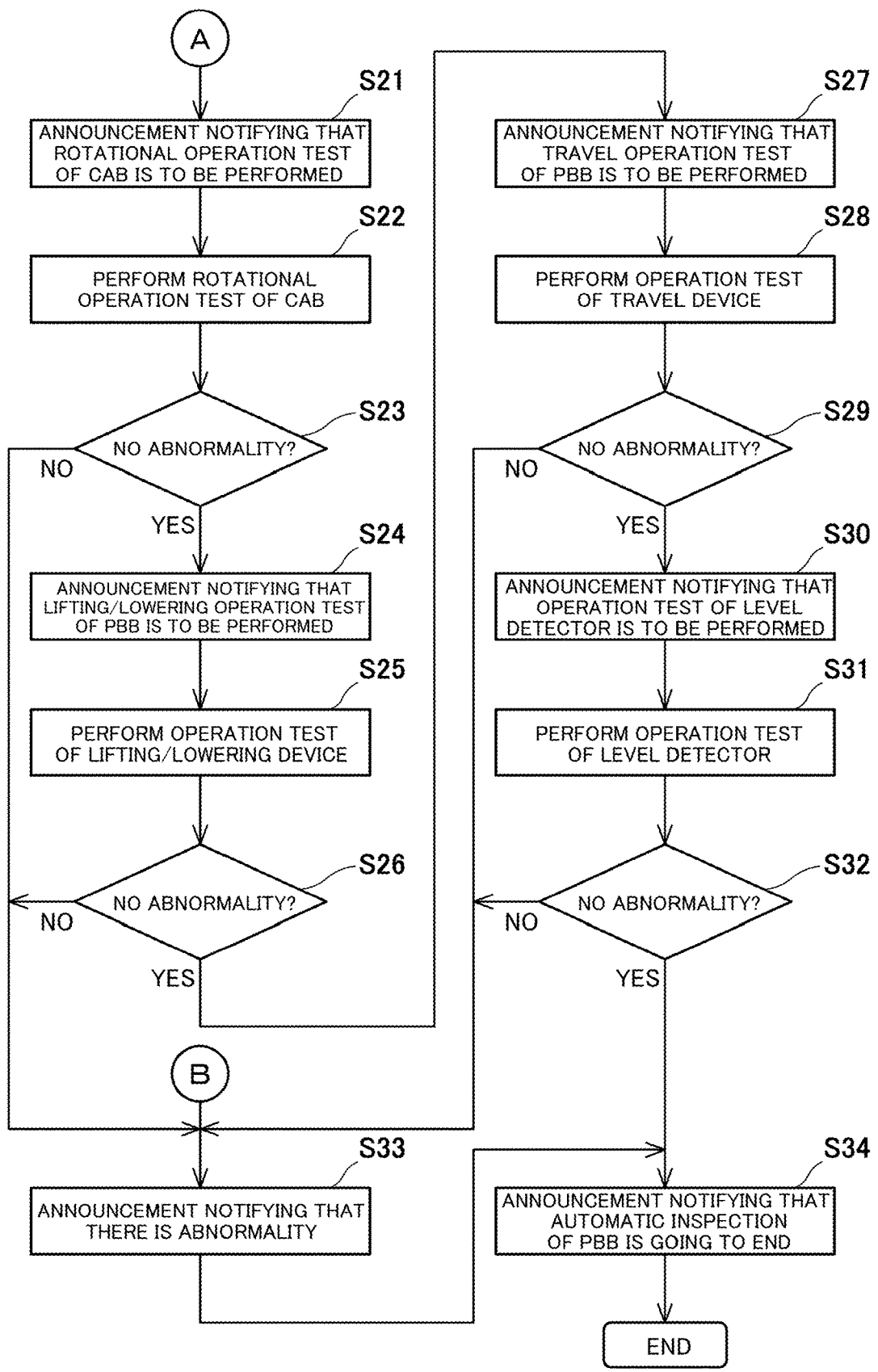
FIG. 6 is a flowchart showing one example of operations performed when an automatic inspection is performed before operating the passenger boarding bridge of FIG. 1.

FIG. 5 and FIG. 6 are flowcharts showing one example of operations that are performed when an automatic inspection is performed before operating the passenger boarding bridge 1. These operations are performed through control by the controller 50.

An external device transmits an inspection start command to the controller 50. Upon receiving (an input of) the inspection start command from the external device via the communication device 51, the controller 50 starts an automatic inspection. Since the aforementioned automatic inspection program is prestored in the storage unit of the controller 50, the controller 50 performs the automatic inspection in accordance with the automatic inspection program. Examples of the external device that transmits the inspection start command include not only the aforementioned management server, but also a mobile terminal such as a smartphone on which dedicated application software is installed.

In the automatic inspection, operation tests in which a plurality of devices are caused to perform predetermined operations are carried out in a predetermined order (steps S7 and S10 in FIG. 5 and steps S22, S25, S28, and S31 in FIG. 6). First, an operation test of each device is briefly described. Thereafter, a further description is given with reference to FIG. 5 and FIG. 6. It should be noted that a below-described method of performing each operation test is merely a non-limiting example.

Hereinafter, an operation test of the floor of the cab 6 (the inclinable floor equipment 61), which is performed in step S7, is described. The inclinable floor equipment (a device) 61 includes, for example, the inclinable floor (the body of the device), a motor (a driver) that operates the inclinable floor, a current sensor that measures an electric current value of the motor, and two limit switches. One of the limit switches detects that the operated inclinable floor has reached an upper limit position, and the other limit switch detects that the operated inclinable floor has reached a lower limit position. In the operation test, after the motor is driven to rotate in the regular direction for a predetermined time, the motor is driven to rotate in the reverse direction for a predetermined time. Whether the motor is in a normal condition or not is determined based on whether the electric current value of the motor while the motor is thus driven to rotate is within a predetermined range or not. In a case where there is no abnormality in the motor (i.e., in a case where the motor is in a normal condition), when the motor is driven to rotate in the regular direction for the predetermined time, if a predetermined one of the limit switches is not actuated, it is detected that there is abnormality in the predetermined one limit switch or in its circuitry, whereas when the motor is driven to rotate in the reverse direction for the predetermined time, if the other limit switch is not actuated, it is detected that there is abnormality in the other limit switch or in its circuitry. Here, if the two limit switches are actuated concurrently, it is detected that there is abnormality in the limit switches or in their circuitry.

Next, an operation test of the closure 7, which is performed in step S10, is described. The closure (a device) 7 includes, for example, the bellows portion (the body of the device), a motor (a driver) that operates (expands and contracts) the bellows portion, a current sensor that measures an electric current value of the motor, and two limit switches. One of the limit switches detects that the operated bellows portion has reached a forward limit position, and the other limit switch detects that the operated bellows portion has reached a backward limit position. In this operation test, similar to the case of the operation test of the inclinable floor equipment 61, the motor is driven to rotate in the regular direction for a predetermined time and to rotate in the reverse direction for a predetermined time, and thereby the presence or absence of abnormality in, for example, the motor and the limit switches is detected.

Next, an operation test of the level detector 8, which is performed in step S31, is described. The level detector (a device) 8 includes, for example, the wheel 8a, a motor (a driver) that operates the wheel 8a (moves the wheel 8a forward and backward), a current sensor that measures an electric current value of the motor, and two limit switches. One of the limit switches detects that the operated wheel 8a has reached a forward limit position, and the other limit switch detects that the operated wheel 8a has reached a backward limit position. In this operation test, similar to the case of the operation test of the inclinable floor equipment 61, the motor is driven to rotate in the regular direction for a predetermined time and to rotate in the reverse direction for a predetermined time, and thereby the presence or absence of abnormality in, for example, the motor and the limit switches is detected.

Next, a rotational operation test of the cab 6 (an operation test of the cab rotator 62), which is performed in step S22, is described. The cab rotator (a device) 62 includes, for example, the entire cab 6 (the body of the device), a motor (a driver) that operates (rotates) the cab 6, a current sensor that measures an electric current value of the motor, an encoder (a rotary encoder) included in the motor, and two limit switches. When the cab 6 is operated (rotated to the left), one of the limit switches detects that the cab 6 has reached a left rotation limit position, and also, when the cab 6 is operated (rotated to the right), the other limit switch detects that the cab 6 has reached a right rotation limit position. In this operation test, similar to the case of the operation test of the inclinable floor equipment 61, the motor is driven to rotate in the regular direction for a predetermined time and to rotate in the reverse direction for a predetermined time, and thereby the presence or absence of abnormality in, for example, the motor and the limit switches is detected. In addition, in a case where there is no abnormality in the motor (i.e., in a case where the motor is in a normal condition), whether or not the encoder is in a normal condition is determined (i.e., the presence or absence of abnormality in the encoder is detected) based on whether or not an output value of the encoder is within a normal range in relation to the drive time of the motor.

Next, an operation test of the lifting/lowering device 10, which is performed in step S25, is described. The lifting/lowering device (a device) 10 includes, for example, two support pillars (the body of the device) configured to be extendable and retractable, a motor (a driver) that operates, i.e., extends and retracts, the support pillars, a current sensor that measures an electric current value of the motor, an encoder (a rotary encoder) included in the motor, and two limit switches. When the lifting/lowering device 10 is operated (extended), one of the limit switches detects that the lifting/lowering device 10 has reached an extension limit position, and also, when the lifting/lowering device 10 is operated (retracted), the other limit switch detects that the lifting/lowering device 10 has reached a retraction limit position. In this operation test, similar to the case of the operation test of the cab rotator 62, the motor is driven to rotate in the regular direction for a predetermined time and to rotate in the reverse direction for a predetermined time, and thereby the presence or absence of abnormality in, for example, the motor and the limit switches is detected, and in addition, the presence or absence of abnormality in the encoder is detected.

Next, an operation test of the travel device 11, which is performed in step S28, is described. The travel device (a device) 11 includes, for example, the two travel wheels (the body of the device) 12, two motors (drivers) 13 that rotate the respective travel wheels 12 (in regular and reverse directions); current sensors that measure electric current values of the respective motors 13; and encoders (rotary encoders) included in the respective motors 13. The tunnel unit 5 includes, for example, limit switches. When the travel device 11 travels forward (i.e., when the tunnel unit 5 is extended), one of the limit switches detects that the travel device 11 has reached a forward travel limit position (i.e., the tunnel unit 5 has reached an extension limit position), and also, when the travel device 11 travels backward (i.e., when the tunnel unit 5 is retracted), the other limit switch detects that the travel device 11 has reached a backward travel limit position (i.e., the tunnel unit 5 has reached a retraction limit position). In the operation test, for example, the two motors are driven to rotate in the regular direction for a predetermined time to cause the travel device 11 to travel forward, and also, the two motors are driven to rotate in the reverse direction for a predetermined time to cause the travel device 11 to travel backward. In this way, similar to the case of the operation test of the cab rotator 62, the presence or absence of abnormality in, for example, the motors, the encoders, and the limit switches is detected.

As described above, each device subjected to the operation test includes, for example, a device body, a driver or drivers (a motor or motors) controlled by the controller 50 to operate the device body, and sensors (limit switches, each of which detects the operation state of the device body; an encoder or encoders that detect the operation state of the motor or motors). By performing the operation tests, the presence or absence of abnormality in the drivers and sensors can be detected based on predetermined conditions (e.g., moving amounts in relation to an operation time). In each operation test, the motor(s) is/are driven to rotate in the regular direction for a predetermined time, and then driven to rotate in the reverse direction for a predetermined time. In this manner, each device is caused to operate in one direction, and is then caused to operate in the reverse direction, such that at the end of the operation test, the device is brought back to its original state (i.e., the state that the device is in at the start of the operation test).

Next, as shown in FIG. 5, when an inspection start command is inputted to the controller 50 (YES in step S1), the controller 50 determines whether or not a person has been detected outside the PBB (Passenger Boarding Bridge) based on the presence or absence of a detection signal input from the laser scanners 21a and 21b (step S2). If it is determined that a person has been detected outside the PBB (i.e., if the controller 50 has received a detection signal input from at least one of the laser scanners 21a and 21b), the controller 50 causes the speakers 23 and 24 to make an announcement (i.e., to perform an audio output) that urges the person to retreat (step S4). In this case (i.e., if YES in step S2), the controller 50 may cause only the external speaker 24 to make the announcement.

Next, the controller 50 determines whether or not a person has been detected inside the PBB based on the presence or absence of a detection signal input from the motion sensors 20 (step S3). If it is determined that a person has been detected inside the PBB (i.e., if the controller 50 has received a detection signal input from at least one of the motion sensors 20), the controller 50 causes the speakers 23 and 24 to make an announcement that urges the person to retreat (step S4). In this case (i.e., YES in step S3), the controller 50 may cause only the internal speakers 23 to make the announcement.

It should be noted that the order of these steps S2 and S3 may be reversed. In a case where no person has been detected in the steps S2 and S3, the controller 50 causes the speakers 23 and 24 to make an announcement notifying that an automatic inspection of the PBB is going to start (step S5).

Thereafter, the controller 50 causes the speakers 23 and 24 to make an announcement notifying that an operation test of the floor of the cab 6 (the inclinable floor equipment 61) is to be performed (step S6). Then, the controller 50 performs the operation test of the floor of the cab 6 (the inclinable floor equipment 61) (step S7).

In a case where no abnormality has been detected by the operation test performed in step S7 (i.e., if YES in step S8), the controller 50 causes the speakers 23 and 24 to make an announcement notifying that an operation test of the closure 7 is to be performed next (step S9). Thereafter, the controller 50 performs the operation test of the closure 7 (step S10).

In a case where no abnormality has been detected by the operation test performed in step S10 (i.e., if YES in step S11), the controller 50 causes the speakers 23 and 24 to make an announcement notifying that a rotational operation test of the cab 6 is to be performed next (step S21). Thereafter, the controller 50 performs the rotational operation test of the cab 6 (i.e., an operation test of the cab rotator 62) (step S22).

In a case where no abnormality has been detected by the operation test performed in step S22 (i.e., if YES in step S23), the controller 50 causes the speakers 23 and 24 to make an announcement notifying that a lifting/lowering operation test of the PBB is to be performed next (step S24). Thereafter, the controller 50 performs the operation test of the lifting/lowering device 10 (the lifting/lowering operation test of the PBB) (step S25).

In a case where no abnormality has been detected by the operation test performed in step S25 (i.e., if YES in step S26), the controller 50 causes the speakers 23 and 24 to make an announcement notifying that a travel operation test of the PBB is to be performed next (step S27). Thereafter, the controller 50 performs the operation test of the travel device 11 (the travel operation test of the PBB) (step S28).

In a case where no abnormality has been detected by the operation test performed in step S28 (i.e., if YES in step S29), the controller 50 causes the speakers 23 and 24 to make an announcement notifying that an operation test of the level detector is to be performed next (step S30). Thereafter, the controller 50 performs the operation test of the level detector 8 (step S31).

In a case where no abnormality has been detected by the operation test performed in step S31 (i.e., if YES in step S32), the controller 50 causes the speakers 23 and 24 to make an announcement notifying that the automatic inspection of the PBB is going to end (step S34). Then, the controller 50 ends the automatic inspection.

If it is determined No (i.e., if it is determined that there is abnormality) in any of the steps S8, S11, S23, S26, S29, and S32, the controller 50 causes the speakers 23 and 24 to make an announcement notifying that there is abnormality in the PBB. Thereafter, the controller 50 further causes the speakers 23 and 24 to make an announcement notifying that the automatic inspection of the PBB is going to end (step S34), and then ends the automatic inspection.

The controller 50 stores therein inspection results of the automatic inspection, and transmits the inspection results to the external device via the communication device 51. If the inspection results of the automatic inspection indicate that there is abnormality in the passenger boarding bridge 1, a different passenger boarding bridge in a normal condition is operated instead of the passenger boarding bridge 1.

The operation tests described above (steps S7, S10, S22, S25, S28, and S31) are merely one example, and the order of the operation tests may be changed, or other operation tests may be performed. In a case where the floor of the cab 6 does not include the inclinable floor and is entirely configured as a fixed floor, the above-described steps S6 to S8 are eliminated. Step S5 (the step of making the announcement notifying that the automatic inspection is going to start) may be performed immediately after step S1 (between steps S1 and S2).

According to the present embodiment, before the operation test of each device is performed, information indicating that the operation test of the device is to be performed (one example of operation test-related information) is announced, and thereby a warning can be given inside and outside the passenger boarding bridge 1. This makes it possible to perform the automatic inspection of the passenger boarding bridge 1 in improved coordination with persons, such as workers. The above description has given, as an example of the operation test-related information, which is announced (notified) before the operation test of each device is performed, information indicating that the operation test of the device is to be performed (i.e., is going to start) (see steps S6, S9, S21, S24, S27, and S30, for example). In this case, the operation test-related information may contain one of, or both of, the following pieces of information: information indicating that the operation test of the device is to be performed (i.e., is going to start); and information that urges a person or persons to retreat.

The input of the inspection start command to the controller 50 can be performed via communications, for example, by performing an inspection start operation with an external device that is located at a remote position from the passenger boarding bridge 1. By merely performing the inspection start operation, the automatic inspection can be carried out.

In the examples shown in FIG. 5 and FIG. 6, before performing the first operation test, the controller 50 determines whether or not a person has been detected outside the PBB (Passenger Boarding Bridge) based on the presence or absence of a detection signal input from the laser scanners 21a and 21b, and determines whether or not a person has been detected inside the PBB based on the presence or absence of a detection signal input from the motion sensors 20. If it is determined that a person has been detected outside and/or inside the PBB, the controller 50 causes the speakers 23 and 24 to make an announcement that urges the person to retreat. Thereafter, when no person is detected any more both outside and inside the PBB, the controller 50 performs the operation test. This makes it possible to perform the operation test in improved coordination with persons. Here, when no person is detected any more both outside and inside the PBB, the operation test may be performed (started) automatically, or the operation test may be started upon receiving a specific command.

It should be noted that after the inspection start command is inputted to the controller 50, until the automatic inspection is ended, the controller 50 may always determine whether or not a person has been detected outside the PBB and whether or not a person has been detected inside the PBB. Then, for example, in a case where a person has been detected outside and/or inside the PBB before performing the operation test of each device, the controller 50 may cause the speakers 23 and 24 to make an announcement that urges the person to retreat, and then, when no person is detected any more both outside and inside the PBB, the controller 50 may perform the operation test. This makes it possible to perform the operation test in improved coordination with persons. Here, when no person is detected any more both outside and inside the PBB, the operation test may be performed (started) automatically, or the operation test may be started upon receiving a specific command.

In a case where a person is detected outside and/or inside the PBB while the operation test of any device is being performed, the controller 50 may temporarily stop the operation test, cause the speakers 23 and 24 to make an announcement that urges the person to retreat, and thereafter, when no person is detected any more both outside and inside the PBB, resume the operation test. This makes it possible to perform the operation test in improved coordination with persons. Here, when no person is detected any more both outside and inside the PBB, the controller 50 may resume the operation test automatically, or may resume the operation test upon receiving a specific command.

In the present embodiment, in the operation test of each device, the device is caused to operate in one direction, and then caused to operate in the reverse direction (i.e., the direction opposite to the one direction), such that at the end of the operation test, the device is brought back to a state that the device is in at the start of the operation test. Therefore, when all the operation tests are ended, the passenger boarding bridge 1 is in a state that the passenger boarding bridge 1 is in before the start of the first operation test. Accordingly, when all the operation tests are ended (i.e., when the inspection is ended), the passenger boarding bridge 1 is in a predetermined state (i.e., a state that the passenger boarding bridge 1 is in before the start of the inspection) at a predetermined standby position where the passenger boarding bridge 1 stands by before being operated. This makes it possible to smoothly perform the operation of docking the passenger boarding bridge 1 with the aircraft when the aircraft arrives.

In the present embodiment, the announcement equipment (the speakers 23 and 24) is used as the notifier that notifies the operation test-related information. Alternatively, for example, a display device that displays characters, symbols, etc., a siren such as a whistle siren, a revolving lamp, lighting equipment, or an area alert device utilizing weak radio waves may be used as the notifier.

The operation test-related information is information that is notified inside and/or outside the passenger boarding bridge 1 by the notifier during a period from when the inspection start command is inputted to the controller 50 until the operation test of the last device is ended (i.e., during an automatic inspection period). The operation test-related information includes at least one of the following types of information: information that is notified before the start of the operation test of the first device among the devices, the information indicating that the automatic inspection is going to start (see step S5, for example); information that is notified during the automatic inspection period, the information indicating that the automatic inspection is being performed; information that is notified before the operation test of each device is performed (started), the information indicating that the operation test of the device is going to start; information that is notified while the operation test of each device is being performed, the information indicating that the operation test of the device is being performed; and information that urges a person to retreat.

The operation test-related information may be notified in any manner, so long as the notified information is recognizable by a person, such as a worker. The operation test-related information may be notified, for example, in the form of verbal information outputted from a speaker, or in the form of audio information outputted from a speaker, such as particular music or a sound of a siren or the like, or in the form of light information from, for example, a revolving lamp, or any other lighting equipment, that emits light in a particular color, or in the form of characters and/or symbols displayed by a display device.

As described above, the operation test-related information is notified during the automatic inspection period, and the operation test-related information may be notified not only before the start of the operation test of each device, but also during the operation test of each device or through the entire automatic inspection period, for example, in the form of audio information such as music or a sound of a siren or the like, or in the form of light information from, for example, a revolving lamp, or other lighting equipment, that emits light in a particular color.

From the foregoing description, numerous modifications and other embodiments of the present invention are obvious to those skilled in the art. Accordingly, the foregoing description is to be construed as illustrative only, and is provided for the purpose of teaching those skilled in the art the best mode for carrying out the present invention. The structural and/or functional details may be substantially modified without departing from the scope of the present invention.

INDUSTRIAL APPLICABILITY

The present invention is useful, for example, as a system for performing an automatic inspection of a passenger boarding bridge, the system making it possible to perform the automatic inspection of the passenger boarding bridge in improved coordination with persons, such as workers.

REFERENCE CHARACTERS LIST

1 passenger boarding bridge
2 terminal building
6 cab
61 inclinable floor equipment
62 cab rotator
7 closure
8 level detector
10 lifting/lowering device
11 travel device
20 motion sensor
21 laser scanner
23 internal speaker
24 external speaker
50 controller

The invention claimed is:
1. A system for performing an automatic inspection of a passenger boarding bridge including a plurality of devices that are operatable,
  the passenger boarding bridge including:
    a rotunda connected to a terminal building and rotatable in regular and reverse directions about a vertical axis;

a tunnel unit whose proximal end is connected to the rotunda in such a manner that the tunnel unit is liftable and lowerable, the tunnel unit including a plurality of tunnels that are fitted together in a telescopic manner, the tunnel unit being configured to be extendable and retractable in a longitudinal direction;

a cab rotatably provided at a distal end of the tunnel unit; and a drive column mounted to a frontmost one of the tunnels of the tunnel unit or to the cab, the drive column including a lifting/lowering device and a travel device, the lifting/lowering device being configured to lift and lower the tunnel unit and the cab, the travel device being mounted below the lifting/lowering device and configured to travel on a ground, wherein each of the lifting/lowering device and the travel device is one of the plurality of devices, the system comprising:

a notifier provided on at least one of the cab, the drive column, and the frontmost tunnel of the passenger boarding bridge; and a controller configured to control each of the devices and the notifier, wherein the controller is configured to:

when an inspection start command is inputted to the controller, perform an operation test of each of the devices in a predetermined order to detect presence or absence of abnormality in each device; and during a period from when the inspection start command is inputted to the controller until the operation test of a last device among the devices is ended, cause the notifier to notify operation test-related information inside and/or outside the passenger boarding bridge, and the operation test-related information includes at least one of the following types of information:

information that is notified before a start of the operation test of a first device among the devices, the information indicating that the automatic inspection is going to start;

information that is notified during an automatic inspection period, the information indicating that the automatic inspection is being performed;

information that is notified before the operation test of each device is performed, the information indicating that the operation test of the device is going to start;

information that is notified while the operation test of each device is being performed, the information indicating that the operation test of the device is being performed; and information that urges a person to retreat.

2. The system for performing an automatic inspection of a passenger boarding bridge according to claim 1, the system further comprising:

a first sensor that detects a person inside the passenger boarding bridge; and a second sensor that detects a person outside the passenger boarding bridge, wherein the controller is configured to:

in a case where a person is detected by the first sensor and/or the second sensor before performing the operation test of each device, cause the notifier to notify the operation test-related information that urges the person to retreat; and then perform the operation test when each of the first sensor and the second sensor detects no person any more.

3. The system for performing an automatic inspection of a passenger boarding bridge according to claim 1, the system further comprising:

a first sensor that detects a person inside the passenger boarding bridge; and a second sensor that detects a person outside the passenger boarding bridge, wherein the controller is configured to:

in a case where a person is detected by the first sensor and/or the second sensor while the operation test of each device is being performed, temporarily stop the operation test and cause the notifier to notify the operation test-related information that urges the person to retreat; and then resume the operation test when each of the first sensor and the second sensor detects no person any more.

4. The system for performing an automatic inspection of a passenger boarding bridge according to claim 1, wherein in performing the operation test of each device, the controller is configured to perform control of the device to:

cause the device to operate in one direction; and then cause the device to operate in a reverse direction, such that at an end of the operation test, the device is brought back to a state that the device is in at a start of the operation test.

\* \* \* \* \*